United States Patent [19]

Emmerich

[11] Patent Number: 4,907,718

[45] Date of Patent: Mar. 13, 1990

[54] METHOD OF AND APPARATUS FOR FEEDING TACKS TO SHOE LASTING MACHINES

[75] Inventor: Wolfgang Emmerich, Bad Münstereifel, Fed. Rep. of Germany

[73] Assignee: Hacoba-Textilmaschinen GmbH & Co. KG, Wuppertal, Fed. Rep. of Germany

[21] Appl. No.: 279,560

[22] Filed: Dec. 2, 1988

[30] Foreign Application Priority Data

Dec. 3, 1987 [DE] Fed. Rep. of Germany ....... 3740941

[51] Int. Cl.[4] .............................................. B65G 29/02

[52] U.S. Cl. .......................................... 221/1; 221/13; 221/123; 221/165; 221/180; 227/117; 227/135

[58] Field of Search ....................... 227/117, 135, 118; 221/13, 123, 266, 133, 68, 165, 180, 1; 10/165, 169

[56] References Cited

U.S. PATENT DOCUMENTS

| | | | |
|---|---|---|---|
| 1,845,651 | 2/1932 | Dickson | 221/165 X |
| 2,355,311 | 8/1944 | Linkner | 10/165 X |
| 2,735,096 | 2/1956 | Miller | 221/68 |
| 2,856,606 | 10/1958 | Richards | 221/68 |
| 3,071,291 | 1/1963 | Davis | 221/68 |
| 4,694,974 | 10/1987 | Heck et al. | 227/118 X |

FOREIGN PATENT DOCUMENTS

| | | |
|---|---|---|
| 721061 | 5/1942 | Fed. Rep. of Germany . |
| 1785305 | 1/1972 | Fed. Rep. of Germany . |

*Primary Examiner*—Douglas D. Watts
*Assistant Examiner*—Rinaldi Rada
*Attorney, Agent, or Firm*—Peter K. Kontler

[57] ABSTRACT

Apparatus for feeding tacks to a heel lasting machine has one or more slideways which deliver series of successive tacks from discrete receptacles to selected axially parallel flutes in the peripheral surface of a rotor in such a way that the shanks of the tacks enter the flutes and the heads of the tacks overlie the upper side of the rotor. The peripheral surface of the rotor is surrounded by the internal surface of a stationary housing which has a set of pockets for reception of entire tacks from the rotor. The transfer of tacks from the rotor into the pockets of the housing is effected pneumatically, and the conveying of tacks from the pockets into the lasting machine takes place by gravity and/or pneumatically. The apparatus has a discrete stop for the discharge end of each slideway; such stop or stops can be actuated to bias the head of the adjacent tack against the upper side of the respective slideway and to thus interrupt the delivery of tacks from the respective receptacle to the rotor. The rotor is indexible by a stepping motor which receives signals from a control circuit in accordance with a selected program.

29 Claims, 5 Drawing Sheets

METHOD OF AND APPARATUS FOR FEEDING TACKS TO SHOE LASTING MACHINES

BACKGROUND OF THE INVENTION

The present invention relates to improvements in methods of and in apparatus for supplying nails to shoe lasting and like machines, and more particularly to improvements in methods of and in apparatus for supplying so-called tacks which can be used to fix shoe uppers and/or other parts of articles of footwear on lasts or analogous supports.

German Pat. No. 721,061 to Alter discloses an apparatus for supplying tacks to shoe heel and shoe tip lasting machines. A rotor has a set of receiving means for tacks and is indexible to a plurality of different angular positions in each of which a different receiving means is ready to accept a tack. Each such indexing operation involves an angular movement of the rotor from a predetermined starting position through a predetermined angle so that a selected number of receiving means can move into register with the discharge end or ends of one or two slideways which can feed tacks to the rotor. The angle must be changed if the rotor is to accept a larger or a smaller number of tacks. Each adjustment necessitates complete stoppage of the apparatus (and of the entire lasting machine) and a resetting of the mechanical transmission in the mechanism which serves to drive the rotor. All this takes up much time so that the apparatus is idle for relatively long intervals. Moreover, repeated back and forth movements of the rotor to and from its starting position also take up substantial amounts of time and contribute to wear upon the moving parts and their bearings. Still further, the rotor cannot be used to capacity because the receiving means are distributed only along a certain portion of its periphery. The means for receiving tacks from the rotor includes a housing with grooves which are axially offset relative to the receiving means of the rotor. Therefore, the rotor must be moved axially preparatory to transfer of a selected number of tacks into the housing. This, too, contributes to a reduction of the output of the patented apparatus.

Published German patent application No. 1,785,305 of Bumbalek discloses a tack supplying apparatus with two chutes which deliver tacks into discrete channels discharging into a common outlet for delivery of tacks to the lasting machine. The discharge ends of the chutes are adjacent elastic holders which tend to engage the adjacent tacks to thus block the admission of tacks into the respective channels. Reciprocable studs are provided to lift the holders off the discharge ends of the respective chutes in order to permit the tacks to descend into the adjacent channels. The output of the apparatus which is disclosed by Bumbalek is low.

OBJECTS OF THE INVENTION

An object of the invention is to provide a novel and improved apparatus which is more versatile than conventional apparatus and can deliver to a lasting machine tacks in any one of a number of different formations.

Another object of the invention is to provide a novel and improved method of arraying different types of tacks preparatory to admission of the thus assembled arrays into a lasting machine.

A further object of the invention is to provide an apparatus wherein the conversion from gathering a first array to gathering of a different array takes up a minimum of time and can be fully automated.

An additional object of the invention is to provide the apparatus with novel and improved means for selectively blocking the admission of tacks from a particular source to the station where the tacks are gathered into arrays.

Still another object of the invention is to provide the apparatus with novel and improved means for transferring arrays of tacks to a lasting machine.

A further object of the invention is to provide the apparatus with novel and improved means for indexing the rotor of the arraying means.

Another object of the invention is to provide an apparatus which can gather arrays consisting of identical or different tacks.

An additional object of the invention is to provide the apparatus with novel and improved means for removing arrays of stacks from the rotor in a simple and time-saving operation.

Another object of the invention is to provide an apparatus wherein the rotor need not perform any other but angular movements.

A further object of the invention is to provide the apparatus with novel and improved means for receiving tacks from the rotor.

SUMMARY OF THE INVENTION

One feature of the present invention resides in the provision of an apparatus for feeding tacks to a lasting machine, namely for feeding nails of the type having a head (particularly a large-diameter flat round head) and a shank extending from one side of the head. The apparatus comprises a rotor having a peripheral surface provided with substantially axially parallel flutes for reception of shanks of discrete tacks, means for supplying tacks to the rotor including at least one track (particularly a slideway wherein the tacks advance by gravity) having a discharge end adjacent the peripheral surface of the rotor and serving to admit into the flutes the shanks of a series of successive tacks in corresponding angular positions of the rotor relative to the discharge end of the track, a housing having an internal surface adjacent the peripheral surface of the rotor and provided with pockets each of which registers with one of the flutes in each of a plurality of different angular positions of the rotor relative to the housing, means for simultaneously transferring tacks from the rotor into the pockets, means for conveying tacks from the pockets to a lasting machine, stop means actuatable to engage a tack in the region of the discharge end of the track so as to prevent the engaged tack and he following tacks of the series from leaving the track, and means for actuating the stop means The track can be provided with an exposed surface serving to support the heads of the tacks of the aforementioned series, and the stop means can include a pusher which is actuatable to urge the head of a tack in the region of the discharge end against the exposed surface of the track. The pusher can include or constitute a reciprocable piston or plunger having a surface which can engage the head of a tack in the region of the discharge end of the track and is at least substantially parallel to the adjacent portion of exposed surface of the track. The track can further include a portion which is located upstream of the discharge end and slopes downwardly toward the discharge end at a first angle. The discharge end slopes downwardly toward the peripheral surface of the rotor at a second angle which is smaller than the first angle.

The actuating means can include a fluid-operated motor, particularly a pneumatic motor.

The track can include a portion of the housing, and such portion of the housing preferably includes the discharge end of the track. The stop means can be mounted on a closure or lid for the housing and for the rotor.

In accordance with a presently preferred embodiment, the supplying means includes a plurality of tracks each of which has a discharge end adjacent the peripheral surface of the rotor, and the stop means then includes a discrete stop for each discharge end. The apparatus then comprises (or can comprise) a discrete source of tacks for each track.

The internal surface of the housing includes a first arcuate section in the region of the discharge end or ends of one or more tracks, and a second section which is provided with the aforementioned pockets. Such second section can extend along an arc of approximately 180°. The flutes can be uniformly spaced apart from each other along the entire peripheral surface of the rotor.

The apparatus can further comprise a preferably flat plate-like barrier which is movable relative to the housing between a first position in which it permits the transfer of tacks from the rotor into the pockets and a second position in which it blocks the transfer of tacks from the rotor, and means for moving the barrier between the first and second positions. The barrier can extend along an arc and is preferably movable in the circumferential direction of the rotor. The upper side of the rotor serves to support the heads of tacks having shanks in the flutes of the peripheral surface of the rotor, and the underside of the barrier is preferably flush with the upper side of the rotor.

The transferring means can include a source of pressurized fluid (such as air) and means for conveying fluid from the source into the flutes of the rotor. Such conveying means can include a chamber in the rotor, channels which connect the chamber with the flutes, conduit means connecting the chamber with the source, and regulating valve means in the conduit means. The channels can be machined into or otherwise formed in the upper side of the rotor. Such channels are overlapped by the aforementioned closure for the rotor and for the housing.

The apparatus can further comprise means for indexing the rotor about a predetermined axis (particularly about a vertical axis) in order to move the flutes into register with the discharge end of a single track or with the discharge end of a selected track. The indexing means can comprise a stepping motor. For example, the stepping motor can comprise a rocker which is turnable back and forth about the predetermined axis, means for turning the rocker back and forth, and a freewheel between the rocker and the rotor. The turning means can include a fluid-operated motor, such as a pneumatic motor.

Still further, the apparatus can comprise means for arresting the rotor in predetermined angular positions.

The actuating means can include control means including means for selecting those pockets which are to receive tacks from the rotor and for actuating the stop means as a function of the distance of the discharge end or ends from such pockets.

Another feature of the present invention resides in the provision of a method of feeding tacks to a shoe lasting machine, particularly of feeding tacks of the type having a head and a shank extending from one side of the head. The method comprises the steps of establishing at least two sources of first and second tacks having shanks of a first and second length, respectively, assembling selected numbers of first and second tacks into an array including conveying first and second tacks from the respective sources along discrete first and second paths to an arraying station, and simultaneously transferring the entire array of tacks from the arraying station to the lasting machine.

The method can further comprise the step of selectively arresting tacks in the paths in order to interrupt the conveying of tacks from the corresponding sources to the arraying station.

The assembling step can include forming a circular or part circular array of first and second tacks.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
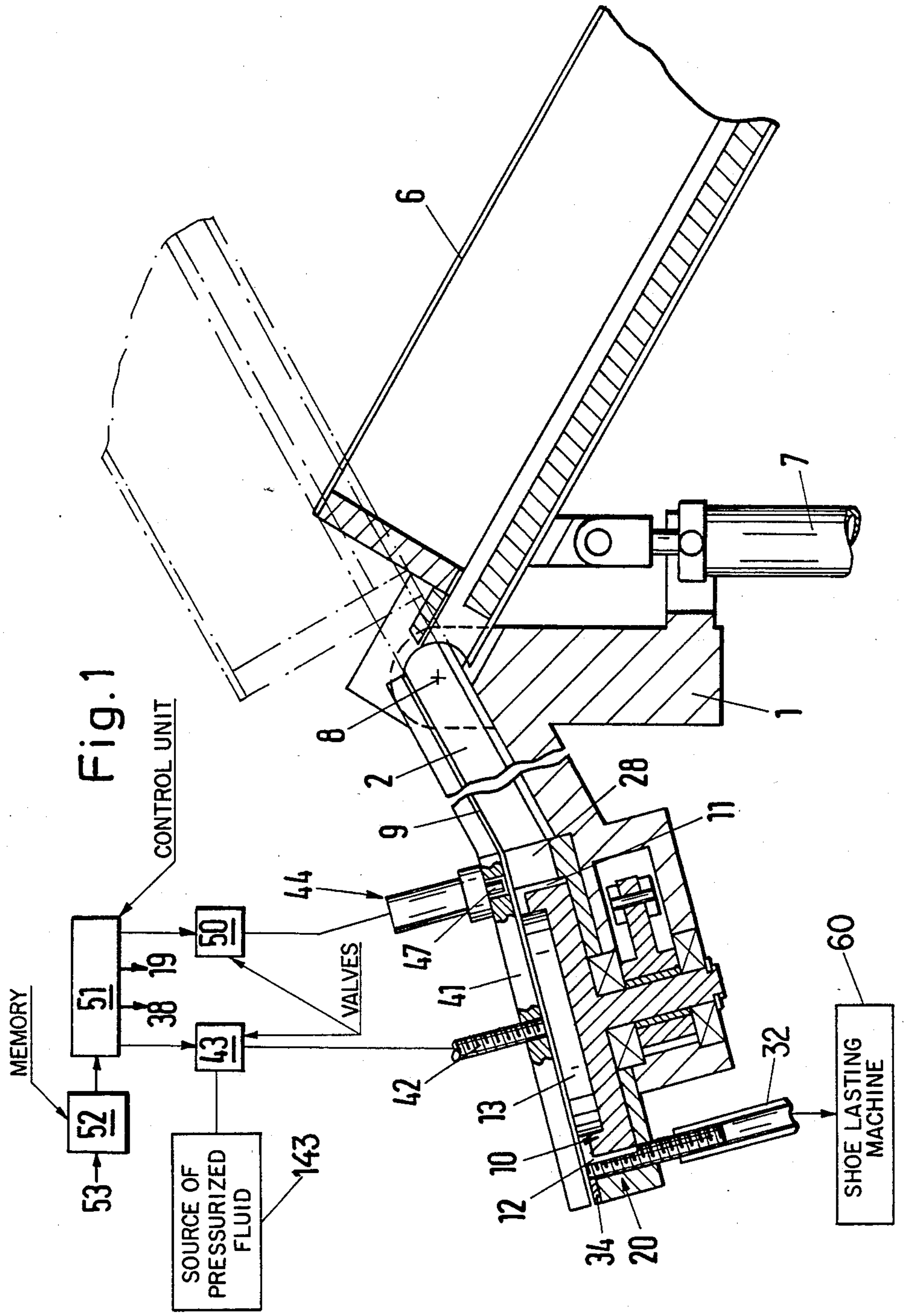
FIG. 1 is a fragmentary partly elevational and partly vertical sectional view of an apparatus which embodies invention, the sources of tacks being shown in two different positions.
Figure 2:
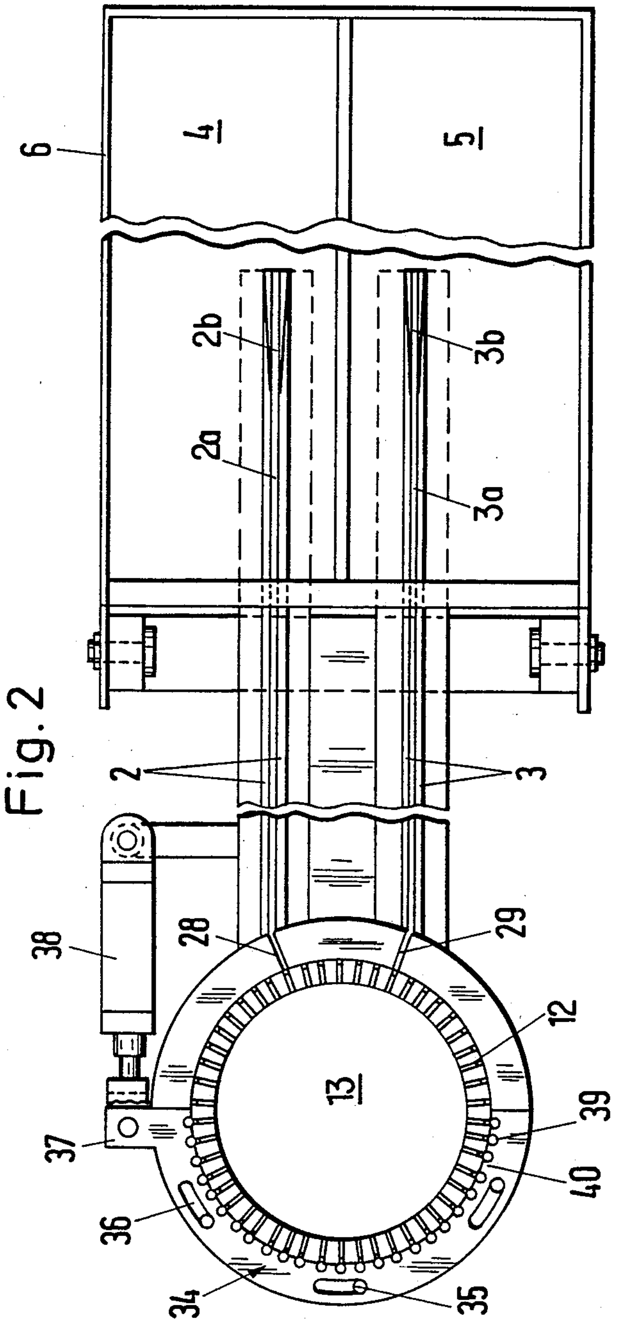
FIG. 2 is a plan view of the apparatus, with the closure for the rotor and rotor housing omitted.
Figure 3:
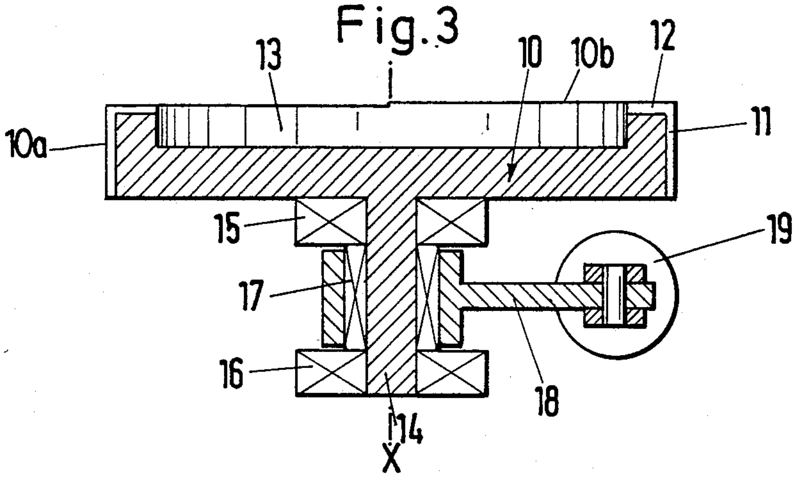
FIG. 3 is a central sectional view of the rotor and a partly elevational and partly sectional view of the means for indexing the rotor.
Figure 7:
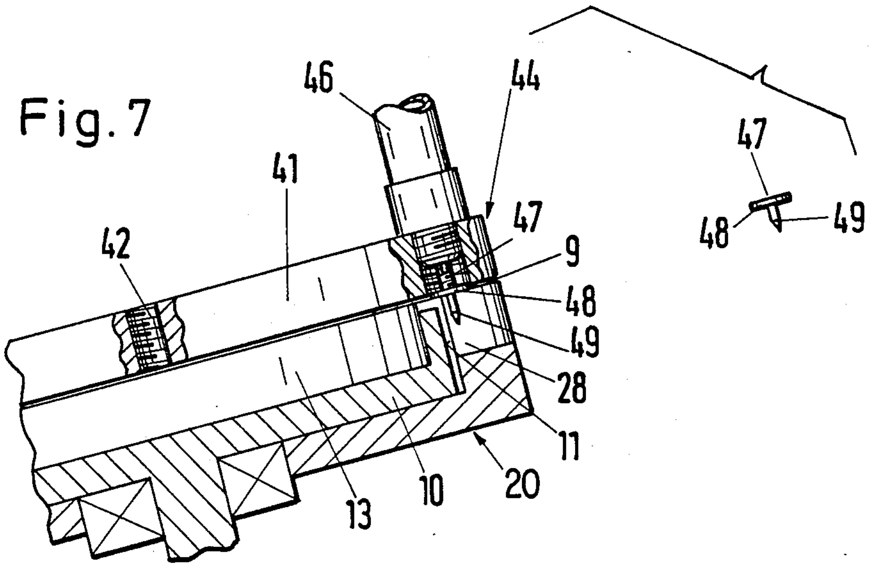
FIG. 7 is a fragmentary sectional view of the housing and a partly elevational and partly sectional view of a portion of the closure for the housing and for the rotor, and further showing one of the stops for foremost tacks in the tracks which deliver tacks from the respective sources to the flutes of the rotor.

Referring first to FIGS. 1 and 2, there is shown an apparatus which serves to supply arrays of tacks to a shoe lasting machine 60. The apparatus comprises a frame 1 which supports means for supplying tacks to an arraying station accommodating a rotor 10 which is indexible about a vertical or other axis X (FIG. 3). The supplying means includes two slotted tracks 2, 3 each of which is a slideway wherein the tacks of a series of successive tacks can slide by gravity toward axially parallel flutes 11 in the peripheral surface 10*a* of the rotor 10. The upper ends of the tracks 2, 3 can receive tacks from discrete sources 4, 5 forming part of or being insertable into a shaking box 6. The box 6 is articulately connected to the frame 1 by a horizontal hinge 8 so that it can be pivoted between the solid-line and phantom-line positions of FIG. 1. The means for pivoting the box 6 and its receptacles 4, 5 about the axis of the hinge 8 comprises a fluid-operated motor 7, such as a pneumatic cylinder and piston unit. When the box 6 is pivoted to the phantom-line position of FIG. 1, the outlets of the receptacles 4, 5 respectively permit tacks to enter the upper ends of the tracks 2, 3 for sliding movement toward the rotor 10. Each track has an exposed upper side or surface 9 provided with a longitudinally extending slot 2*a*, 3*a* with a downwardly tapering inlet 2*b*, 3*b* for convenient entry of the shanks 49 (see FIG. 7) of tacks each of which further includes a preferably round and preferably relatively large head 48. The undersides of the heads 48 slide along the upper sides 9 of the respective tracks 2, 3 while the shanks 49 extend into the slots 2*a*, 3*a* and advance toward the discharge ends 28, 29 of the respective tracks. The means for vibrating the box 6 (in order to promote entry of shanks 9 into the respective slots 2*a*, 3*a*) is not shown in the drawing. For example, the receptacle 4 can constitute a source of tacks having relatively short shanks 49, and the receptacle 5 can constitute a source of tacks having longer shanks 49.

Figure 4:
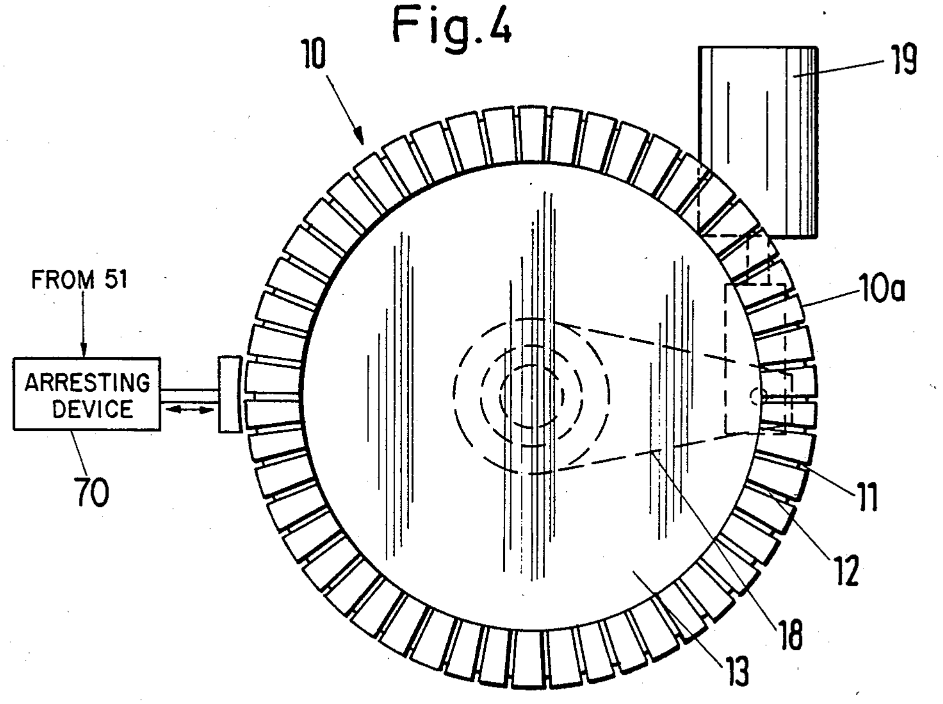
FIG. 4 is a plan view of the structure which is shown in FIG. 3.

The rotor 10 is rotatably mounted in the frame 1 in such a way that its peripheral surface 10*a* is adjacent the outlets 26, 27 of discharge ends 28, 29 of the tracks 2, 3, respectively. The details of a presently preferred rotor 10 are shown in FIGS. 3 and 4. The peripheral surface 10*a* of this rotor has fifty equidistant axially parallel receiving means in the form of flutes 11 each of which can receive a shank 49 and which form a complete circle extending all the way around the periphery of the rotor. The upper side 10*b* of the rotor 10 is formed with radially extending channels 12 which communicate with discrete flutes 11 and with a centrally located plenum chamber 13 which is machined into or otherwise formed in the upper side 10*b*.

The shaft 14 of the rotor 10 is mounted in antifriction bearings 15, 16 which are installed in the frame 1 beneath the rotor and flank a freewheel 17 forming part of means for indexing the rotor about the axis X so as to move selected flutes 11 into register with the outlets 26, 27 at the discharge ends 28, 29 of the respective tracks 2 and 3. The indexing means further comprises a motion transmitting rocker 18 which surrounds the freewheel 17 and cooperates with the latter in such a way that the freewheel indexes the rotor 10 by a step when the rocker 18 is turned clockwise but the freewheel cannot turn the rotor when the rocker is caused to turn in a counterclockwise direction (or vice versa). The means for turning the rocker 18 back and forth about the axis X of the rotor 10 comprises a fluid-operated motor 19 (e.g., a double-acting pneumatic cylinder and piston unit). The indexing means 17–19 acts as a simple stepping motor which can cause the rotor to turn stepwise in one direction but not in the opposite direction. The freewheel 17 can be of any known design. Stepwise angular movements of the rotor 10 are selected in such a way that each such angular movement involves indexing through an angle of 7.2°, i.e., through a distance matching that between the centers of two neighboring flutes 11.

Figure 5:
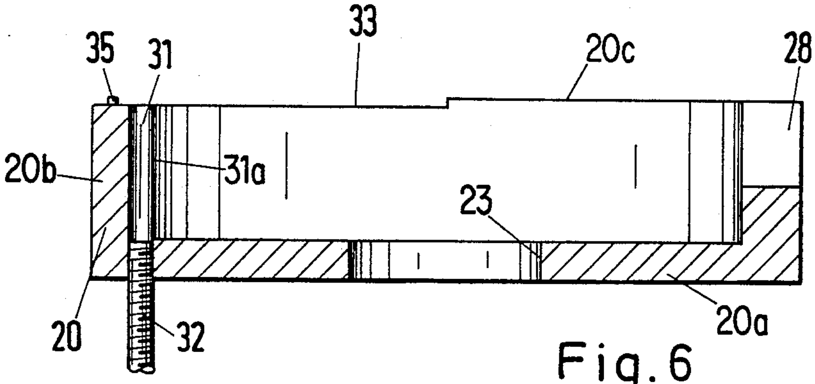
FIG. 5 is a sectional view of the rotor housing, substantially as seen in the direction of arrows from the lines A–B in FIG. 6.
Figure 6:
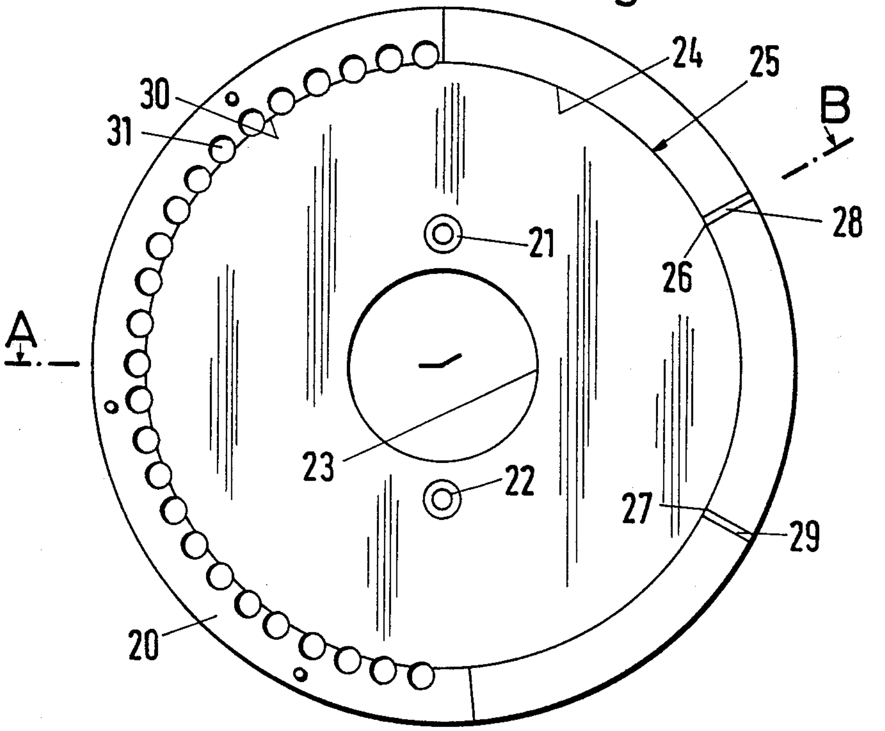
FIG. 6 is a plan view of the housing.

The rotor 10 is indexibly inserted into a substantially cup-shaped housing 20 (see particularly FIGS. 5 and 6) having a bottom wall 20*a* with a central opening 23 for the upper antifriction bearing 15. The bottom wall 20*a* is further formed with several holes (FIG. 6 shows two holes 21, 22 which are disposed diametrically opposite each other with reference to the axis of the rotor 10) and serve for reception of portions of fasteners which separably secure the housing 20 to the frame 1. The internal surface 24 of the cylindrical wall 20*b* of the housing 20 surrounds the peripheral surface 10*a* of the rotor 10 and includes two sections, namely a first arcuate section 25 which is adjacent the tracks 2, 3 and a second section 30 extending along an arc of substantially 180° and provided with twentyfive equidistant round pockets 31 each having a diameter sufficient to receive the head 48 of a tack. The end portions 28, 29 of the tracks 2, 3 are integral parts of the housing 20, i.e., the outlets 26, 27 of the slots 2*a*, 3*a* in these tracks are actually provided in the section 25 of internal surface 24, namely in immediate or very close proximity to the peripheral surface 10*a* of the rotor 10 and hence in immediate or close proximity to the adjacent flutes 11. This ensures predictable entry of shanks 49 of oncoming tacks into those flutes 11 which register with the outlets 26, 27.

The mutual spacing of slots 31*a* which form part of the pockets 31 and establish communication between the main portions of the respective pockets and the internal space of the housing 20 (such internal space receives the rotor 10) is the same as the mutual spacing of flutes 11 in the peripheral surface 10*a* of the rotor. Each flute 11 is dimensioned to readily receive a shank 49 but is too narrow to receive a head 48. On the other hand, the cross-sectional area of each pocket 31 suffices to ensure that the pocket can receive an entire tack, i.e., the diameter of each pocket 31 at least matches the diameter of a head 48.

The means for conveying arrays of tacks from the pockets 31 to the lasting machine 60 includes flexible or rigid conduits 32 which can deliver the arrays to selected portions of the machine 60, e.g., to a part which serves for the application of tacks to shoe uppers in the regions of the heels. The means for driving the thus conveyed tacks into the material of an article of footwear in the machine 60 is of conventional design and its construction and/or mode of operation forms no part of the present invention.

The sections 25, 30 of internal surface 24 of the housing 20 preferably do, but need not, extend along arcs of 180°.

That portion (33) of the upper side 20*c* of the cylindrical wall 20*b* of the housing 20 which is adjacent the arcuate section 30 of the internal surface 24 is nearer to the bottom wall 20*a* than the other portion of the upper side 20*c*. This provides room for a flat plate-like arcuate barrier 34 (FIGS. 1 and 2) which is movable in the circumferential direction of the rotor 10. The barrier 34 has arcuate slots 36 with centers of curvature on the axis X, and such slots serve to receive guide pins 35 which extend from the cylindrical wall 20*b* in the recessed portion 33 of the upper side 20*c* and cooperate with the surfaces bounding the respective slots 36 in order to confine the barrier to movements in the circumferential direction of the rotor 10. The means for moving the barrier 34 between a first position which is shown in FIG. 2 and a second position includes an arm 37 which is attached to or is integral with one end portion of the barrier, and a fluid-operated motor 38 (e.g., a pneumatic double-acting cylinder and piston unit) which is mounted in the frame 1 or on another stationary part of the apparatus and can rock the barrier 34 between its first and second positions. The barrier 34 has cutouts or windows 39 which register with the pockets 31 in the first position of the barrier. The cutouts 39 alternate with blocking portions 40 which overlie the pockets 31 in the second position of the barrier 34 so that the blocking portions 40 then prevent the heads 48 of tacks from sliding off the upper side 10*b* of the rotor 10 and into the adjacent pockets 31. The strokes of the piston rod o the motor 38 are selected in such a way that the barrier 34 can be moved only through a relatively small angle, namely an angle which suffices to move the blocking portions 40 between the (inoperative) positions of FIG. 2 and the positions in which each such blocking portion overlies one of the pockets 31. The underside of the barrier 34 is flush or substantially flush with the upper side 10*b* of the rotor 10, i.e., with that part of the rotor which supports the undersides of the heads 48.

The apparatus further comprises a closure or lid 41 which overlies the upper side 10*b* of the rotor 10 and the upper side 20*c* of the cylindrical wall 20*b* of the housing 20. The closure 41 serves to seal the upper side of the plenum chamber 13 as well as the upper sides of the channels 12 between the chamber 13 and the flutes 11. The central portion of the closure 41 carries an air supplying conduit 42 which can deliver a pressurized gaseous fluid (such as air) from a source 143 to the plenum chamber 13 in response to opening of a regulating valve 43 which is installed in the conduit 42 and receives signals from the corresponding output of a control unit 51. Relatively short-lasting bursts of pressurized fluid suffice to ensure expulsion of the shanks 49 from the respective flutes 11 into the adjacent pockets 31.

Figure 8:
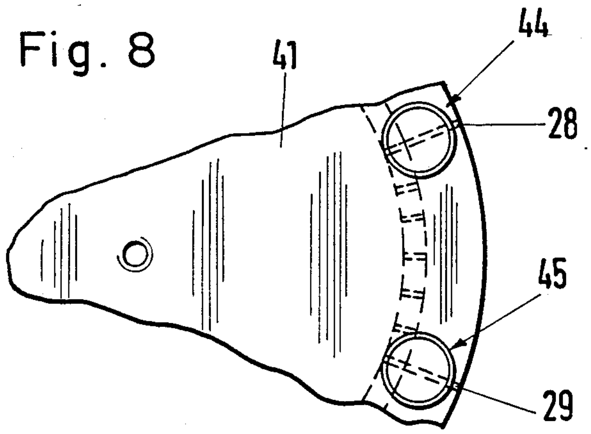
FIG. 8 is a fragmentary plan view of the closure and a plan view of the two stops.

The closure 41 supports two stops 44 and 45 (see particularly FIGS. 7 and 8) which can be actuated in response to signals from the control unit 51 to move their pushers 47 into engagement with the heads 48 of tacks on the adjacent portions of upper sides 9 of the tracks 2, 3 in order to arrest such tacks and the next-following tacks, for example, prior to transfer of an array of tacks from the rotor 10 into the adjacent pockets 31 of the housing 20 preparatory to conveying (via conduits 32) to the lasting machine 60. The pushers 47 constitute the pistons of two fluid-operated motors 46 and have preferably flat bottom surfaces which are parallel to adjacent portions of the upper sides 9 of the respective tracks 2, 3. The pusher 47 of the stop 44 is adjacent the discharge end 28 of the track 2, and the pusher of the stop 45 is adjacent the discharge end 29 of the track 3. The means for regulating the flow of a pressurized fluid to, and the outflow of fluid from, the cylinders of the motors 46 for the stops 44, 45 includes valves 50 (one shown in FIG. 1) which receive signals from the corresponding outputs of the control unit 51.

The pushers 47 need not exert a great force to arrest a tack immediately or shortly upstream of the adjacent flute 11. In order to ensure that a relatively small arresting force will suffice to immediately arrest the tacks having heads 48 in register with the pushers 47, each of the tracks 2, 3 is preferably designed in such a way that it has a main or major (rear) portion extending to the outlet of the respective receptacle 4, 5 and sloping downwardly toward the rotor 10 at a first angle which is greater than the angle of downward inclination of the end portions 28, 29 toward the peripheral surface 10*a* of the rotor 10. This ensures that the speed of movement of tacks along the tracks 2 and 3 decreases as they approach the rotor 10 and the stops 44, 45.

The control unit 51 is connected with a memory 52 which determines the nature of the array of tacks to be assembled in the flutes 11 of the rotor 10. Information which is stored in the memory 52 and is transmitted to the control unit 51 determines the distribution of tacks in the array (i.e., which flutes 11 are to receive tacks from the track 2 or 3), the number of tacks in each array, as well as the sizes of tacks in the array (i.e., whether some or all of the flutes 11 which are to be filled receive tacks from the receptacle 4 or from the receptacle 5). The data input 53 of the memory 52 can receive signals from the operator or directly from the lasting machine 60.

The operation is as follows:

When the control unit 51 receives signals for the gathering of a predetermined array of tacks at the station accommodating the rotor 10, one of its outputs transmits signals to the valve or valves (not shown) for the motor 19 in such a way that the rotor 10 is indexed stepwise to a corresponding number of different angular positions in order to ensure that selected flutes 11 will receive shanks 49 from the slot 2*a* of the track 2 or from the slot 3*a* of the track 3. Stepwise movements of the rotor 10 take place in rapid sequence, and signals from the control unit 51 to the valves 50 which control the motors 46 for the stops 44, 45 are selected in such a way that the pusher 47 of the stop 44 prevents entry of a shank 49 from the slot 2*a* into the adjacent flute 11 when this flute is to remain empty or is to receive a shank 49 from the slot 3*a*, and that the other pusher prevents entry of a shank 49 from the slot 3*a* into the adjacent flute 11 when such flute has already received a shank 49 from the slot 2*a*, when such flute is to remain empty or when such flute is yet to receive a shank 49 from the slot 2*a*. For example, a series of three successive flutes 11 can receive relatively short shanks 49 from the outlet 26 of the discharge end 28 of the track 2, and this can be followed by admission of longer shanks 49 from the outlet 27 of the discharge end 29 into a relatively large number of next-following flutes 11 before three next-following flutes 11 receive relatively short shanks 49 from the track 2. The rotor 10 is indexed until the filled flutes 11 register with selected pockets 31 in the section 30 of internal surface 24 of the housing 20. The motor 19 of the means for indexing the rotor 10 is then arrested and a blocking or arresting device (e.g., a brake shown schematically at 70) is then actuated in response to a signal from the control unit 51 to ensure retention of the rotor 10 in proper angular position for expulsion of shanks 49 from filled flutes 11.

The control unit 51 then transmits a signal to the motor 38 which causes the barrier 34 to change its angular position, namely to move from the second position to the first position of FIG. 2 in which the cutouts 39 register with the pockets 31 and permit transfer of the heads 48 from the upper side 10*b* of the rotor 10 into the adjacent pockets 31. At the same time, or shortly or immediately thereafter, the control unit 51 transmits a signal to the valve 43 which establishes a path for the flow of pressurized fluid from the source 143, through the conduit 42 and into the chamber 13 of the rotor 10. The thus admitted flow of pressurized fluid is distributed into streamlets flowing in the channels 12 and into the respective flutes 11 to effect the transfer of the gathered array of tacks into the adjacent pockets 31. Once in the pockets 31, the tacks descend by gravity and/or under the action of pressurized fluid to be conveyed through the corresponding conduits 32 and into the lasting machine 60.

The next cycle (i.e., the gathering of a fresh array) can begin as soon as the expulsion of tacks into the pockets 31 is completed. In fact, if the control unit 51 receives signals for the gathering of the next array in good time prior to gathering of the preceding array, certain flutes 11 of the rotor 10 can begin to receive shanks 49 of tacks belonging to the next array prior to completed gathering of the preceding array. This contributes to a higher output of the improved apparatus.

The apparatus which is shown in FIGS. 1 to 8 can be modified in a number of ways without departing from the spirit of the invention. For example, the number of tracks can be reduced to one or increased to three or more. The number of stops preferably matches the number of tracks, i.e., each stop serves to selectively block or unblock the path which is defined by a discrete track. It is further possible to use both receptacles 4, 5 for storage of identical tacks; this renders it possible to further shorten the interval of time which is required to complete the gathering of an array of (identical) tacks at the station accommodating the rotor 10.

An important advantage of the improved apparatus is that the stops 44, 45 can be caused to prevent or permit admission of shanks 49 into the flutes 11 of the indexible rotor 10 in any desired sequence so that the rotor can gather a circular or part circular array of tacks in exact accordance with the program which i stored in the memory 52. The rotor 10 need not be indexed back to a starting position upon completed gathering of a particular array; all that is necessary is to continue to index the rotor in one and the same direction in order to start the gathering of tacks which are to form the next array. Therefore, the operator or operators need not adjust the stepping motor if the apparatus is to be converted from the gathering of a first array to the gathering of a different array; all that is necessary is to transmit appropriate signals to the stops 44, 45 while the rotor 10 is indexed in a single direction. This saves much time and increases the output of the apparatus, especially since the gathering of a next-following array of tacks can begin while the gathering of the preceding array is still in progress. For example, each array can comprise a total of fourteen tacks if such tacks are to be conveyed to a lasting machine for the making of children's footwear, a total of eighteen tacks if the articles to be produced are ladies' shoes, and a total of twentyfour tacks for the making of men's footwear. An array can be of such nature that alternate flutes 11 in the peripheral surface 10*a* of the rotor 10 remain empty.

Another important advantage of the improved apparatus is that the flutes 11 of the rotor 10 can receive shanks 49 at frequent intervals because the force with which the series of tacks having their shanks 49 in the slots 2*a*, 3*a* of the tracks 2, 3 acts upon the foremost tack suffices to immediately advance the shank 49 of the foremost tack into the adjacent flute 11 as soon as the pusher 47 of the respective stop 44 or 45 is actuated to move above and away from the head 48 of the adjacent tack in the discharge end 28 or 29 of the respective track. Thus, there is no need to provide means for positively moving the tacks along the respective tracks.

The utilization of pushers 47 having undersides which are substantially parallel to the adjacent portions of the upper sides 9 of the respective tracks 2, 3 exhibits the advantage that, when the stop 44 or 45 is actuated, the shank 49 of the arrested tack extends at least substantially at right angles to the respective upper side 9 and is thus highly unlikely to accidentally extend into the adjacent flute 11 (e.g., under the action of gravity) which could result in undesirable stoppage of the rotor 10. The aforementioned feature that the inclination of the discharge ends 28, 29 toward the peripheral surface 10*a* of the rotor 10 is less pronounced than the inclination of the major portions of tracks 2, 3 also reduces the likelihood of accidental stoppage of the rotor 10 by the shanks 49 of tacks which are arrested adjacent the outlet 26 or 27. Such less pronounced inclination of the discharge ends 28, 29 does not adversely affect the advancement of tacks toward the rotor 10 when the stops 44, 45 are inactive because the force with which the tacks following a tack which has been released by the respective pusher 47 tend to advance toward the rotor suffices to ensure that a freshly released tack is immediately set in motion in a direction to move its shank 49 into the adjacent flute 11.

An advantage of pneumatic motors 46 for the stops 44, 45 is that the compressible gaseous fluid can compensate for eventual deviations of thicknesses of the heads 48 from a standard value, i.e., that the pushers 47 can properly engage relatively thin or relatively thick heads 48 because the supply of pressurized fluid in the cylinder of the respective motor 46 acts not unlike a cushion which can expand or contract depending on the thickness (height) of the head 48 which is biased by the respective pusher 47 so that it bears against the upper side 9 of the corresponding track 2 or 3.

While it is possible to provide tracks with discharge ends 28, 29 which extend into cutouts or holes of the housing 20, the illustrated design (wherein the discharge ends 28, 29 are integral parts of the housing 20) is preferred at this time because it contributes to compactness of the apparatus. The same applies for the placing of stops 44, 45 on top of the closure 41, i.e., this also contributes to compactness of the apparatus.

The provision of two or more tracks contributes to versatility of the improved apparatus. thus, and as already explained above, it is possible to gather arrays consisting of tacks having shorter and longer shanks 49. This depends on the nature of material into which the shanks of the tacks are to be driven. However, an even more important feature of the provision of two or more tracks is that this renders it possible to gather arrays of tacks having longer and shorter shanks. Thus, an array can comprise a first set of tacks with longer shanks and two additional sets of tacks with shorter shanks whereby the additional sets flank the first set of tacks. Such arrays are especially suitable for heel lasting machines.

The feature that the flutes 11 are uniformly distributed along a complete circle and that the pockets 31 are uniformly distributed along a portion of a circle enhances the versatility of the apparatus and contributes to a shortening of the interval which is required for the gathering of a full array of tacks. Moreover, such distribution of the flutes 11 and pockets 31 renders it possible to start with the gathering of a fresh array while the gathering of the preceding array is still in progress.

The barrier 34 ensures that the rotor 10 need not be moved axially preparatory to transfer of an array of tacks into the pockets 31 of the housing 20. This is due to the fact that, when the barrier 34 is moved to its first position (shown in FIG. 2) in which its blocking portions 40 do not interfere with movements of the heads 48 of tacks from the upper side 10*b* of the rotor 10 into the adjacent pockets 31, admission of pressurized fluid into the chamber 13, and thence into the channels 12 in the upper side **10*b* of the rotor, suffices to ensure reliable transfer of a fully array of tacks from the rotor into the adjacent pockets 31 and thence to the lasting machine 60. The blocking portions 40 of the barrier 34 (in the second position of this barrier) can be located at a level beneath the respective heads 48; this ensures that the shanks 49 of the tacks remain the respective flutes 11 of the rotor 10 even if the upper sides 10*b* and 20*c*** of the rotor and housing are inclined to the horizontal.

The discharge ends of the channels 12 are located at the level of the upper ends of the shanks 49 in the flutes 11 to thus ensure predictable expulsion of such shanks from the respective flutes and hence the transfer of entire tacks into the adjacent pockets 31. Since the closure 41 sealingly overlaps the upper sides of the channels 12, compressed fluid which is discharged by the channels 12 into the flutes 11 is compelled to flow downwardly into the corresponding conduits 32 to thus contribute to the action of gravity in rapidly advancing tacks from the pockets 31 into the lasting machine 60.

The stepping motor 17–19 renders it possible to gather successive arrays of tacks in accordance with a preselected program in a simple, time-saving and reliable manner. All that is necessary is to count the number of steps which are to be carried out by the rotor 10 and to actuate the stop 44 and/or 45 in dependency on the angular positions of the rotor. Moreover, the illustrated stepping motor is simple, compact and inexpensive. This does not preclude the utilization of other types of means for indexing the rotor 10. The utilization of a pneumatic motor 19 as a component part of the means for indexing the rotor 10 is particularly desirable and advantageous if the apparatus and/or the lasting machine 60 comprises one or more pneumatically operated parts, i.e., when it is not necessary to provide a source of pressurized fluid solely for the purpose of indexing the rotor 10. The lasting machine 60 can be an automatic side and heel lasting machine of the type ASHL-TT delivered by the International Shoe Machine Corporation ISMC, New Hampshire.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for feeding to a lasting machine tacks of the type having a head and a shank extending from the head, comprising a rotor having a peripheral surface and substantially axially parallel flutes provided in said peripheral surface for reception of shanks of discrete tacks; means for supplying tacks to said rotor, including at least one track having a discharge end adjacent said peripheral surface and arranged to admit into said flutes the shanks of a series of successive tacks in corresponding angular positions of said rotor relative to said discharge end; a housing having an internal surface adjacent said peripheral surface and provided with pockets each of which registers with one of said flutes in each of a plurality of different angular positions of said rotor relative to said housing; means for simultaneously transferring tacks from said rotor into said pockets; means for conveying tacks from said pockets to a lasting machine; stop means actuatable to engage a tack in the region of said discharge end so as to prevent the engaged tack and the following tacks of said series from leaving said track; and means for actuating said stop means.

2. The apparatus of claim 1, wherein said track includes a slideway wherein the tacks advance by gravity toward said discharge end.

3. The apparatus of claim 1, wherein said track has an exposed surface arranged to support the heads of the tacks of said series, said stop means including a pusher actuatable to urge the head of a tack in the region of said discharge end against said exposed surface.

4. The apparatus of claim 3, wherein said pusher is a reciprocable piston having a surface arranged to engage the head of a tack in the region of said discharge end and being at least substantially parallel to the adjacent portion of said exposed surface.

5. The apparatus of claim 1, wherein said track includes a slideway wherein the tacks advance by gravity in a direction toward said peripheral surface, said slideway including a portion which is located upstream of said discharge end and slopes downwardly toward said discharge end at a first angle, said discharge end sloping downwardly toward said peripheral surface at a second angle which is smaller than said first angle.

6. The apparatus of claim 1, wherein said actuating means comprises a fluid-operated motor.

7. The apparatus of claim 6, wherein said motor is a pneumatic motor.

8. The apparatus of claim 1, wherein said track includes a portion of said housing and said portion of said housing includes said discharge end.

9. The apparatus of claim 1, further comprising a closure for said housing and said rotor, said stop means being mounted on said closure.

10. The apparatus of claim 1, wherein said supplying means includes a plurality of tracks having discharge ends adjacent said peripheral surface, said stop means including a discrete stop for each of said discharge ends.

11. The apparatus of claim 10, further comprising a discrete source of tacks for each of said plurality of tracks.

12. The apparatus of claim 1, wherein said internal surface includes a first section in the region of said discharge end and a second section, said pockets being provided in said second section.

13. The apparatus of claim 12, wherein said flutes are uniformly spaced apart from each other along the entire peripheral surface of said rotor.

14. The apparatus of claim 13, wherein said second section of said internal surface extends along an arc of substantially 180°.

15. The apparatus of claim 1, further comprising a barrier movable relative to said housing between a first position in which said barrier permits the transfer of tacks from said rotor into said pockets and a second position in which said barrier prevents the transfer of tacks from said rotor into said pockets, and means for moving said barrier between said first and second positions.

16. The apparatus of claim 15, wherein said barrier has an arcuate shape and is movable in the circumferential direction of said rotor.

17. The apparatus of claim 16, wherein said rotor has an upper side arranged to support the heads of tacks having shanks in said flutes, said barrier having an underside which is substantially flush with the upper side of said rotor.

18. The apparatus of claim 1, wherein said transferring means includes a source of pressurized fluid and means conveying fluid from said source into said flutes.

19. The apparatus of claim 18, wherein said conveying means comprises a chamber in said rotor, channels connecting said chamber with said flutes, conduit means connecting said chamber with said source, and regulating valve means in said conduit means.

20. The apparatus of claim 18, wherein said rotor has an upper side and said fluid conveying means includes channels provided in said upper side and communicating with said flutes, and further comprising a closure overlying the upper side of said rotor.

21. The apparatus of claim 1, further comprising means for indexing said rotor about a predetermined axis so as to move said flutes into register with said discharge end.

22. The apparatus of claim 21, wherein said indexing means comprises a stepping motor.

23. The apparatus of claim 21, wherein said indexing means comprises a rocker turnable back and forth about said axis, means for turning said rocker, and a freewheel between said rocker and said rotor.

24. The apparatus of claim 23, wherein said turning means includes a fluid-operated motor.

25. The apparatus of claim 21, further comprising means for arresting said rotor in predetermined angular positions.

26. The apparatus of claim 1, wherein said actuating means comprises control means including means for selecting those pockets which are to receive tacks from said rotor and means for actuating said stop means as a function of the distance of said discharge end from such pockets.

27. A method of feeding to a lasting machine tacks of the type having a head and a shank extending from the head, comprising the steps of establishing at least two sources of first and second tacks having shanks of a first and a second length, respectively; assembling selected numbers of first and second tacks into an array, including conveying first and second tacks from the respective sources along discrete first and second paths to a cammer rotor at an arraying station; and simultaneously transferring the entire array of tacks from the arraying station to the lasting machine.

28. The method of claim 27, further comprising the step of selectively arresting tacks in said paths so as to interrupt the conveying of tacks from the corresponding sources to the arraying rotor at the station.

29. The method of claim 27, wherein said assembling step includes forming on the rotor a circular or part circular array of first and second tacks.

* * * * *